Aug. 7, 1962 H. I. GLASER 3,048,640
METHOD AND APPARATUS FOR MELTING AND FEEDING
HEAT-SOFTENABLE MATERIALS
Filed Nov. 17, 1958 4 Sheets-Sheet 1
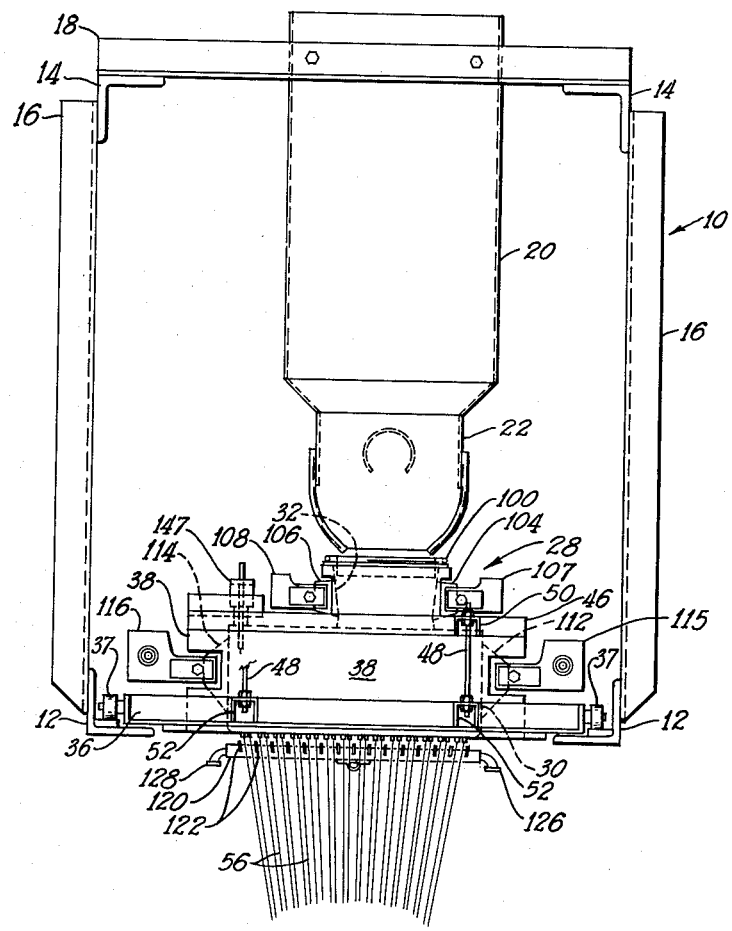
Fig. 1
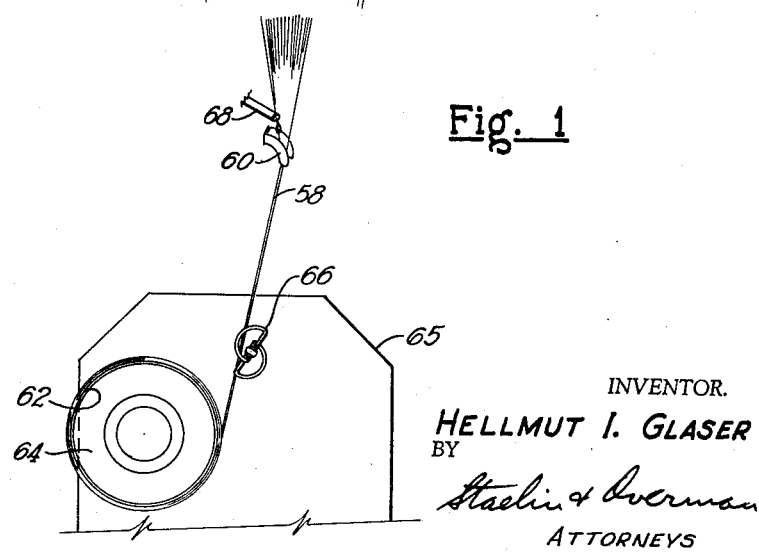
INVENTOR.
HELLMUT I. GLASER
BY
*Staelin & Overman*
ATTORNEYS

INVENTOR.
HELLMUT I. GLASER
BY
ATTORNEYS

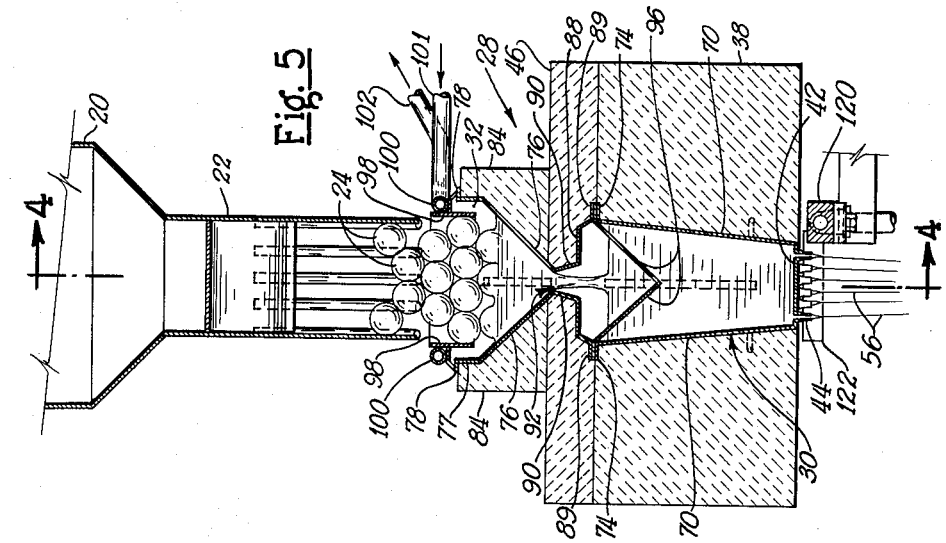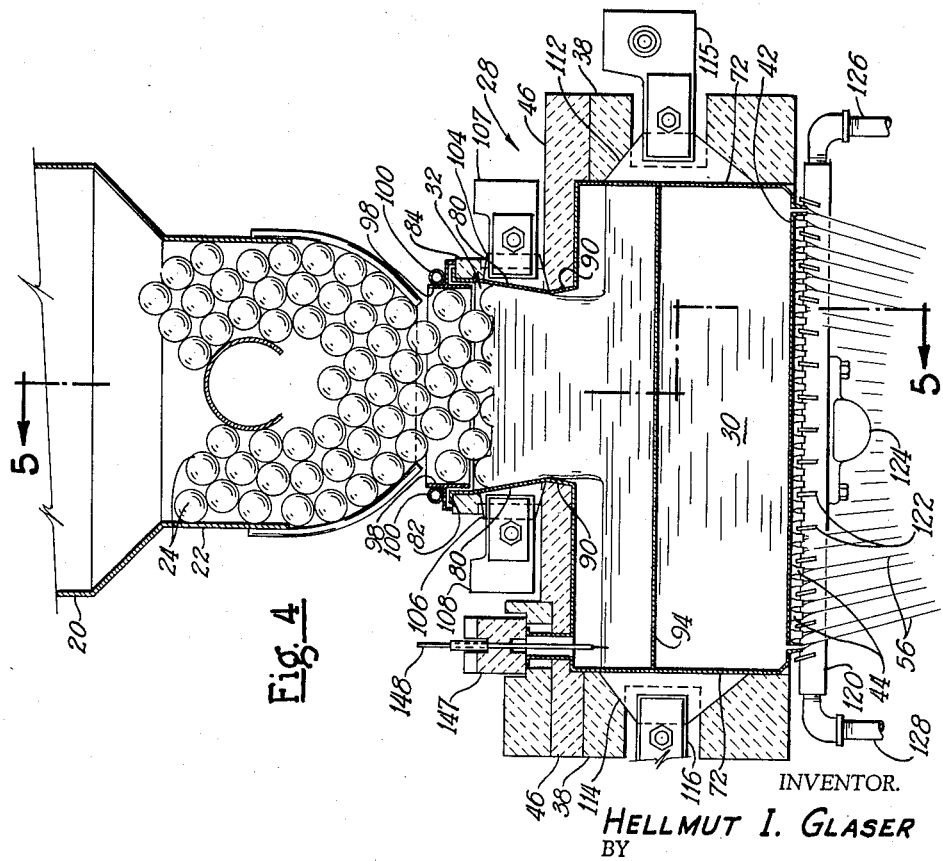
INVENTOR.
HELLMUT I. GLASER
BY
*Staelin & Overman*
ATTORNEYS

INVENTOR.
HELLMUT I. GLASER
BY
ATTORNEYS

United States Patent Office 3,048,640
Patented Aug. 7, 1962

3,048,640
METHOD AND APPARATUS FOR MELTING AND FEEDING HEAT-SOFTENABLE MATERIALS
Hellmut I. Glaser, Anderson, S.C., assignor to Owens-Corning Fiberglas Corporation, a corporation of Delaware
Filed Nov. 17, 1958, Ser. No. 774,170
10 Claims. (Cl. 13—6)

This invention relates to a method of and apparatus for melting heat-softenable material and for delivering or discharging streams of the material and more particularly to an arrangement for heating and melting heat-softenable mineral materials such as glass and flowing streams of the molten material from a feeder and the streams attenuated to linear bodies, filaments or fibers particularly usable in the fabrication of strands, threads or yarns for textile purposes.

In the manufacture of textiles formed of strands, yarns or threads of glass fibers or filaments, the fibers or filaments must be of substantially uniform size and character in order that commercially acceptable textiles may be produced. The glass or mineral material employed in forming filaments for textile uses must be highly refined and of homogeneous character.

To attain high quality glass usable for this purpose, the glass batch is usually melted, fined and refined in a comparatively large furnace containing many tons of glass until the glass is free of seeds, cords, stria and impurities which would impair the quality of the glass. The refined glass from such furnace is fashioned or molded into places or cullet preferably in the shape of small spheres or marbles which are adapted to be resoftened for forming textile filaments.

One process of resoftening the marbles involves the delivery of marbles individually and periodically by mechanical gating means through a chute into the electrically heated feeder. The molten glass in the feeder is at a temperature of upwards of 2300° F. or more while the marbles introduced into the feeder are at room temperature.

A deviation of a few degrees in the temperature of the glass in the feeder changes its viscosity and results in variations in the size or character of the filaments formed from the streams. As each relatively cold marble or piece of glass is delivered into a feeder, it causes an immediate temperature and viscosity change or thermal shock in the molten glass in the feeder.

Thermal shock is accentuated where a large number of streams are flowed continuously from a feeder necessitating successive delivery of individual marbles at short intervals, a condition which causes a continuous fluctuation in the viscosity of the molten glass in the feeder and the streams and renders control difficult.

Another process involves the continuous resoftening or reduction of marbles or cullet to a molten state in a premelter arranged independently of and spaced from the feeder and wherein comparatively large streams of the resoftened glass are flowed from the premelter through the atmosphere into the feeder and the glass heat conditioned in the independent feeder prior to flowing a plurality of streams from the feeder for attenuation to fibers or filaments. Such process effects a reduction of thermal shock in the feeder as heated glass is delivered into the feeder but exposure of the heated glass to atmosphere in its movement from the premelter into the feeder accentuates gasification and formation of excessive volatiles which must be liberated from the glass in the feeder and to a certain extent impairs the control of properly coordinating the rate of melting the glass with the rate of discharge of streams from the independent feeder.

The present invention relates to an improvement on the latter mentioned process and embraces a method of reducing heat-softenable mineral material to a flowable state and delivering the flowable material into a feeder through a restricted confined zone into a feeder whereby control of the softening or melting rate may be accurately coordinated with the flow rate from a confined feeder zone and material delivered to the feeder without thermal shock.

Another object of the invention resides in establishing a melting region and feeder connected by a restricted walled passage wherein the material in solidified form is delivered into the melting region and reduced to a molten condition by controlled heat applied to the melting region and the molten material in the feeder zone maintained in desired condition by controlled heat effective in the feeder.

Another object of the invention is the provision of an apparatus embodying two chambers joined together by a walled passage of restricted area, one of the chambers being adapted to receive solid pieces of heat-softenable material and heat applied thereto to reduce the solid pieces to a molten state and delivering the molten material to the other chamber under confined conditions whereby the formation of volatiles in the molten material is substantially reduced.

A further object of the invention is the provision of a combined melter and feeder for heat-softenable material, such as glass, wherein a melting chamber is integrated with a feeder chamber by a restricted walled throat, the arrangement including flowing electric energy through controlled means to both chambers to generate heat whereby the heat applied in the chambers may be regulated to vary the melting rate of material in the melting chamber and maintain a desired viscosity of the material in the feeder chamber.

Still a further object of the invention resides in a method of and apparatus for melting and conditioning heat-softenable mineral material, such as glass, in an integrated unit of combined melter and feeder wherein the melter and feeder zones are connected by a restricted walled passage through which molten material flows from the melter into the feeder, and flowing electric energy through controlled means to the melter and feeder individually to generate heat in both melter and feeder zones whereby the heating rates may be varied but with substantially no differential in temperature between the molten material in the restricted passage and the material in the feeder and thereby avoiding thermal shock in the feeder.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a front elevational view of an apparatus embodying the invention especially usable for conditioning heat-softenable material from which filaments or fibers may be formed by attenuation;

FIGURE 4 is a vertical sectional view taken substantially on the line 4—4 of FIGURE 3;

FIGURE 5 is a vertical sectional view taken substantially on the line 5—5 of FIGURE 4.

While the method and apparatus of the invention have particular utility in processing and conditioning glass for forming textile filaments, it is to be understood that the method and apparatus of the invention may be utilized for conditioning and processing other materials for various purposes.

Figure 3:
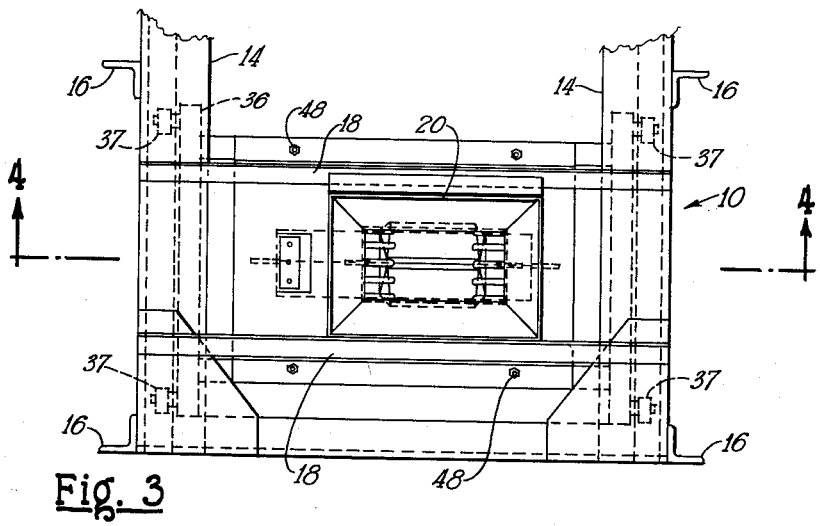
FIGURE 3 is a top plan view of the arrangement shown in FIGURES 1 and 2.
Figure 2:
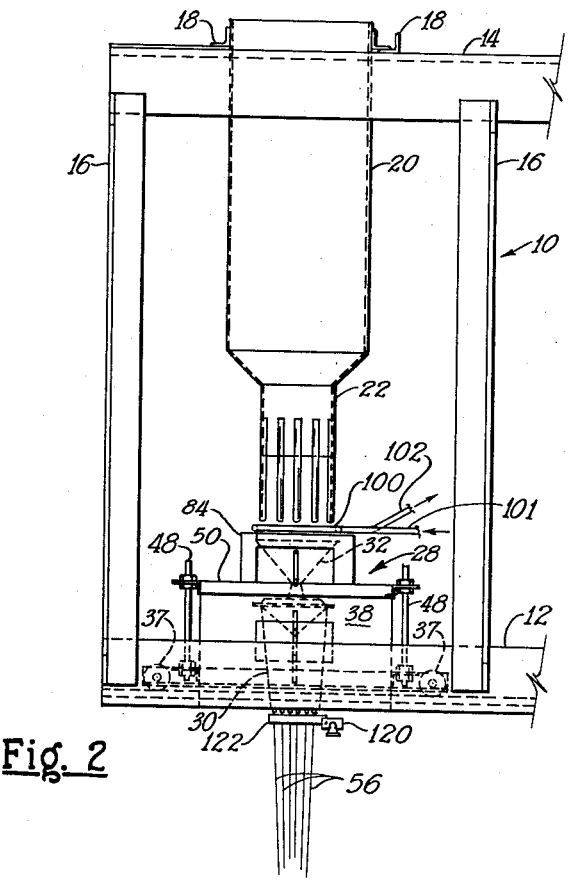
FIGURE 2 is a side elevational view of a portion of the arrangement shown in FIGURE 1.

Referring to the drawings in detail, and initially to FIGURES 1, 2 and 3, a form of the apparatus of the invention is illustrated which is especially adaptable for the formation of fine continuous filaments of glass for fabricating textile strands, threads and yarns. The apparatus is supported upon a frame 10 comprising pairs of vertically spaced horizontally arranged beams 12 and 14 joined by vertical struts 16, the upper members 14 being connected by horizontally arranged beams 18.

The beams 18 of the frame 10 support a hopper 20 having a material delivery portion 22 of reduced size, the hopper adapted to contain a supply of material to be heat-softened or rendered molten and from which fibers or filaments are to be formed. As illustrated, the material such as glass in the hopper 20 is preferably in the form of cullet or marbles 24 for delivery into a melting zone as hereinafter described.

The frame 10 supports a combined or integrated melter and feeder unit 28. The unit 28 includes a feeder or bushing compartment or chamber 30 and a melter chamber 32 which are connected together in a manner hereinafter described. Supported by the lower beams 12 of the frame 10 is a supplemental frame or structure 36 of rectangular shape and provided with rollers 37 engaging the beams 12 to facilitate movement of the frame 36. Mounted upon the supplemental frame 36 is a pair of longitudinally extending blocks or members 38 arranged at the sides of the feeder compartment or chamber 30, the blocks being contoured to embrace or surround the feeder 30. The blocks 38 are formed of high temperature refractory. The bottom of wall 42 of the feeder chamber 30 is formed with a plurality of rows of tips or projections 44, each being formed with an orifice or opening through which the molten or heat-softened glass in the feeder chamber 30 is discharged to provide a plurality of streams from which the filaments or fibers are formed.

A plate or cover 46 is supported by blocks 38 as particularly shown in FIGURES 1, 2, 4 and 5. The blocks 38 are supported upon the supplemental frame 36 and are secured to the supplemental frame 36 by tie bolts 48, their upper ends being secured to transverse bars 50 arranged above the cover plate 46, the lower ends of the tie bolts engaging in clips 52 forming a part of the supplemental frame 36.

The streams, flowing through the orifices in the tips or projections 44, may be processed into fibers or continuous filaments by attenuation. As shown in FIGURE 1, one use of the melter and feeder unit is to provide glass streams from which fine continuous filaments may be formed by mechanical attenuation. The continuous filaments 56 formed from the glass streams are converged into a sliver or strand 58 by means of a gathering device or member 60 and the strand 58 collected by winding the same upon a rotatable sleeve or collector 62 to form a strand package.

The sleeve is supported upon a rotatable collet or arbor 64 driven by a motor or other suitable means (not shown) contained within a housing 65. The streams are attenuated to filaments by winding the strand upon the rotating sleeve 62. Any number of orificed projections 44 may be provided on the bottom wall of the feeder dependent upon the number of filaments desired in the strand 58. The number of filaments in a strand may be upwards of four-hundred or more.

A traverse means 66 may be utilized to distribute the strand lengthwise of the collector sleeve 62 whereby the package is built up of superposed layers of the strand. A lubricant or coating material may be applied to the filaments and as shown in FIGURE 1 a tube or pipe 68 may be disposed adjacent the gathering device 60 arranged to deliver lubricant or other coating material to the gathering device 60 and the coating transferred to the filaments by the wiping action of the filaments.

Figure 6:
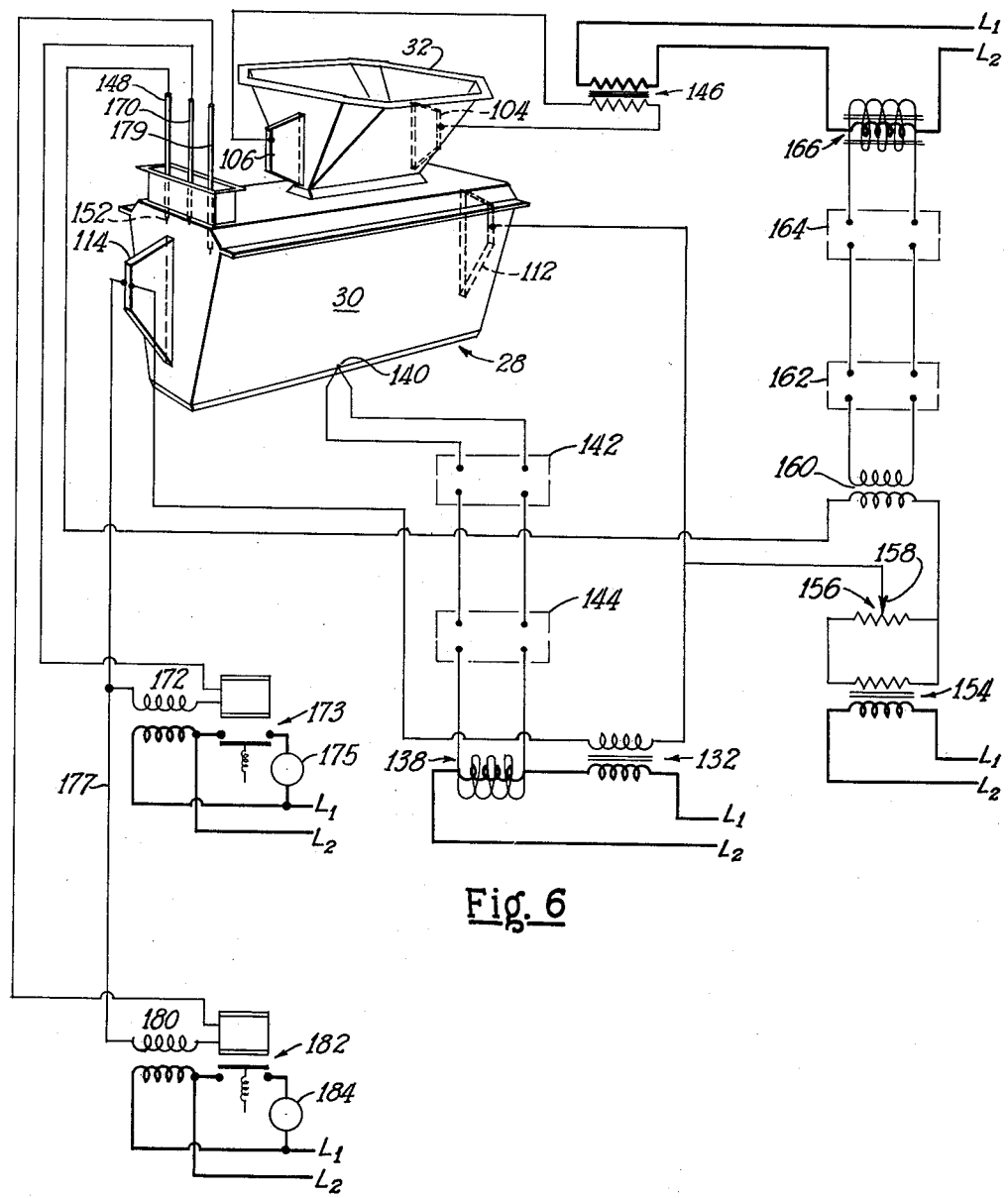
FIGURE 6 is a schematic view illustrating the combined melting and feeder unit and circuits controlling the heating and conditioning of the material in the unit.

The combined melter and feeder unit 28 is particularly illustrated in further detail in FIGURES 4, 5 and 6. One of the important features of the arrangement of the invention resides in connecting the feeder and melter compartments together. The feeder chamber or zone 30 is of rectangular configuration provided by side walls 70 joined with end walls 72, both side and end walls being joined with the bottom wall or floor 42. The walls and other metal components of the feeder 30 and the melter 32 are formed of an alloy of platinum and rhodium or other material capable of withstanding the high temperatures of the molten glass or other material.

As shown in FIGURE 5, the side walls 70 are slightly divergent in an upward direction, the upper ends of the side walls being formed with laterally extending flanges 74 to which the melter compartment is secured. The melter compartment 32 is formed with side wall portions 76 which are in converging relation as shown in FIGURE 5 and which form continuations of vertically arranged side wall portions 77. The upper extremities of side wall portions 77 are formed with upwardly and laterally extending flanges 78.

The melter compartment or chamber 32 is formed with end walls 80 which are slightly convergent in a downward direction as shown in FIGURE 4, the upper ends of the end walls 80 being formed with laterally extending flanges 82. Disposed at each side of the melter 32 are blocks or members 84 of refractory material shaped to embrace or surround the chamber 32 providing a heat insulating means to minimize heat losses from the melter chamber 32 and provide a support for the melting unit through the engagement of the flanges 78 and 82 with the upper surfaces of the blocks 84.

Disposed above the feeder compartment or chamber 30 is a metal cover portion 88 formed with flanges 89 which mate with the flanges 74 and are welded thereto forming a sealed joint. The downwardly extending side wall portions 76 and end walls 80 forming the melter chamber 32 are formed with connecting portions or walls 90 which are joined by welding to the member 88 providing a restricted throat or walled passage 92 connecting the melter compartment 32 with the feeder compartment 30 whereby molten or heat-softened glass or other fiber-forming material in the melter unit 32 may flow into the upper region of the feeder compartment or chamber 30 without contact with the atmosphere.

The width of the throat or passage 92 is preferably substantially less than the diameters or sizes of the cullet or marbles 24 delivered from the hopper 22 into the melter 32 to prevent their passage into the feeder and to reduce cross flow of electric energy between the melting chamber and feeder.

A screen 94, preferably of V-shaped configuration formed by converging perforated walls 96, is disposed within the feeder and extends lengthwise thereof. The perforations or openings in the walls 96 forming the screen are comparatively small so as to prevent the passage of cords or incompletely melted glass that may enter the feeder chamber through the passage 92.

The upper region of the melter compartment 32 is preferably provided with a liner or baffle 98 of rectangular shape having its walls spaced inwardly from the upper portions of the sides and end walls of the melter 32. The rectangularly shaped liner 98 is formed of an alloy of platinum and rhodium or other material having high temperature resistant characteristics.

Surrounding the liner or baffle 98 is a conduit or tube 100 provided with an inlet 101 and an outlet 102. The tube or pipe 100 is adapted to accommodate circulating cooling fluid such as water, oil or air to maintain the liner or baffle 98 below the softening temperature of the glass cullet or marbles 24. Through the provision of the cooled liner 98, devitrification is avoided at the side and end regions of the melter 32 as the marbles of glass at the entrance region of the melter are maintained out of contact with the upper regions of the walls of the melter.

The softening or reduction of the pieces of material or marbles to a flowable or molten condition is carried on in the melting chamber 32 by heat generated by flow of electric current through the walls of the chamber 32. Welded or otherwise secured to the end walls 80 of the melting chamber are lugs or connector terminals 104 and 106 which respectively accommodate terminal clamps 107 and 108. The terminal clamps 107 and 108 are supplied with current by circuit means from a power transformer as hereinafter described. The resistance to current flow through the walls of the melting chamber 32 provides heat for softening or melting the marbles or pieces of material 24 in the melting chamber.

The glass or molten material in the feeder chamber 30 is maintained at the proper temperature and viscosity by the application of heat. Heat is applied by flowing electric current through the feeder 30 and the material contained therein by circuit means substantially independent of the circuit supplying current to the melter 32.

Welded or otherwise secured to the end walls 72 of the feeder chamber 30 are lugs or terminals 112 and 114, the terminals 112 and 114 respectively accommodating connectors or clamps 115 and 116 which are supplied with current through a circuit means shown in FIGURE 6 and hereinafter described.

The current supplied to the feeder 30 passes through the walls of the feeder and through the screen 94 whereby the heat generated by resistance to current flow is substantially uniformly distributed throughout the material in the feeder. By this method the material in the feeder is maintained at a substantially constant viscosity so that uniform streams and filaments of uniform size may be formed from the molten material discharged through the orifice tips 44. As mentioned herein, the formation of filaments of uniform size is dependent upon the maintenance of desired viscosity characteristics of the glass throughout the feeder.

It has been found advantageous to slightly increase the viscosity of the streams by reducing the temperature at a region just beneath the feeder chamber 30 to assure satisfactory attenuation of the streams. A tubular member or manifold 120 is disposed beneath and substantially parallel with the bottom wall or floor 42 of the feeder and is provided with a plurality of transversely extending thin metal fins 122, a fin extending between each two rows of transversely aligned orificed projections 44 as shown in FIGURE 4. The member 120 is mounted upon a suitable support 124.

The ends of the manifold 120 are respectively connected with inlet and outlet pipes 126 and 128. A cooling fluid, such as water, is continuously circulated through the manifold 120 and some of the heat from the streams of glass is conducted by the fins 122 to the manifold 120 and transferred to the circulating fluid in the manifold. Through this arrangement, the viscosity of the streams of glass may be controlled or increased.

The circuit arrangements and components for controlling the current supplied to the melter chamber 32 and the feeder chamber or bushing 30 and a means for maintaining a substantially constant level or head of glass or molten material in the feeder are illustrated schematically in FIGURE 6. The current supply to the feeder or bushing 30 is derived through the transformer 132 from a power source or supply line designated L1 and L2. The power source, for example, may be a 440 volt, 60 cycle alternating current.

The transformer 132 reduces the voltage in the secondary circuit to a value of about two volts, the secondary providing heating current of one or more kilo-amperes. The primary of the transformer 132 is in circuit with a saturable core reactor 138 which functions as a variable impedance for adjusting current flow through the feeder chamber 30 to secure the desired temperature therein. The saturable core reactor 138 is associated with a thermocouple 140 which may be secured to a wall of the feeder and functions to monitor an electric signal corresponding to the feeder temperature.

The thermocouple circuit includes an amplifier 142 which amplifies the temperature signal to a regulator 144, the latter supplying direct current to the saturable core reactor 138 which modifies the impedance in the primary of the transformer 132 to automatically maintain a fixed feeder temperature. The regulator 144 is adjustable to vary the temperature of the feeder. For example, a rise in temperature of the feeder causes direct current supplied from the regulator 144 to the reactor 138 to be reduced thereby increasing the impedance and diminishing the current flow in the secondary circuit to the feeder.

If the temperature of the feeder decreases, the regulator 144 increases the direct current to the reactor 138, reducing the impedance and increasing the current flow in the second circuit to increase the heating of the feeder. Through this method of control, the temperature, and hence viscosity of the material in the feeder, is maintained substantially constant regardless of variations in the rate of flow of the material through the orifices in the tips 44 of the floor of the feeder.

The supply of molten material in the feeder is replenished from molten material in the melter chamber 32, the molten material flowing into the feeder through the confined zone provided by the restricted passage or throat 92 shown in FIGURE 5. The heating current for the melter 32 is supplied through a transformer 146 connected with a power line or source designated L1, L2. The rate of delivery of marbles, cullet or pieces of mineral material 24 into the melter 30 from the hopper 22 is dependent upon the rate of melting or reduction of the marbles to a molten state in the melter 32.

The rate of melting of the marbles is dependent upon the amount of heat and hence the amount of current flow through the melter 30. The arrangement illustrated includes automatic controls whereby the rate of flow of molten glass or material from the melter 32 into the feeder 30 is synchronized or coordinated with the rate of delivery of the glass of the streams flowing through the orificed tips 44 of the feeder.

This control is maintained by the continuous regulation through a glass level control circuit which monitors the current flow to the melting chamber 32 and hence the melting rate of the marbles or pieces of material in the melter 32. The control circuit includes a probe bar or member 148 which is insulatingly supported by a member 147 of refractory or other high temperature resistant material, the probe 148 being vertically adjustable. The probe bar 148 has a tapered extremity 152 normally in contact with the surface of the glass or molten material in the feeder 30.

A difference in potential is established between the probe bar 148 and the molten glass by circuit connections with a transformer 154 through a voltage divider 156. The transformer 154 is supplied with current from a line L1, L2 and provides a secondary circuit of comparatively low voltage to the voltage divider 156. The adjustable member 158 of the voltage divider provides for the selection of voltage across the feeder and molten glass therein through the terminal 112 and the probe member 148. A coupling transformer 160 in circuit with the probe 148 impresses a current signal from the probe circuit to an amplifier 162 and the amplified current signal fed to a regulator 164.

The regulator 164 is in circuit with a second saturable core actuator 166 in the primary circuit of transformer 146 which supplies current to the melting chamber 32. The amplifiers 142 and 162 and the regulators 144 and 164 are of conventional construction. The amplifier 162 and regulator 164 function to transfer an amplified probe current signal which constantly monitors or regulates the flow of current to the melting chamber 32 thereby controlling the melting rate of material in the melter 32 and hence the rate of replenishment of molten glass in the feeder 30 as the molten glass is discharged through the orifices in the bottom wall or floor of the feeder.

It has been found that variations in the depth of the probe from a point at which contact is completed with the surface of the molten glass in the feeder to a slight depth can be utilized to effect variation in contact resistance and current in the probe circuit corresponding to a range of glass levels in the feeder 30 whereby the current in the probe circuit may be employed to regulate the level of the glass in the feeder and a desired glass level preselected by adjustment of the regulator 164.

The tapered extremity 152 of the probe provides for substantial variations in the area of contact with the glass upon minute variations in the level of the glass which provides a correspondingly greater variation in resistance or extent of contact with the molten glass.

The saturable core reactor 166 controls the amount of current supplied to the melter 32 so that variations in the level of the molten glass in the feeder 30, through the probe circuit, influences the reactor 166 so that more or less current may be supplied to the melter 32 to increase or decrease the rate of melting of the marbles and hence the rate of flow of molten glass from the melter 32 into the feeder 30.

In the operation of the probe glass level control arrangement, the probe 148 is mounted with the tapered portion 152 extending about one-thirty-second of an inch below the surface of the molten glass in the feeder when the glass is at the level to be maintained. Variations in current value, due to variations in the level of the glass, are effective through the regulator 164 and the reactor 166 to modify current flow to the melting chamber 32.

If the level of the glass in the feeder rises, current flow in the probe circuit increases, which current flow is effective through the amplifier 162, regulator 164 and reactor 166 to increase the impedance in the circuit of the melting chamber 32. This causes a reduction in current flow to the melter 32 and hence reduces the heat applied in the melter. This effects a reduction in the melting rate and an increase in the viscosity of the molten glass in the melter and consequently reduces the flow rate of molten glass into the feeder until the level of the glass in the feeder is lowered to the desired standard level.

Should the level of the glass in the feeder 30 fall below the desired level, the resistance in the probe circuit is decreased, which through the amplifier 162, regulator 164 and reactor 166 increases current flow to the melter 32 to thereby apply more heat in the melter, increasing the melting rate and decreasing the viscosity of the molten glass to increase the flow of glass into the feeder to bring the glass level up to the desired standard. The desired level of glass in the feeder is automatically maintained so that a substantially constant head of molten glass is contained within the feeder.

Through the arrangement above described, the marbles of glass maintained in a bulk supply above the melter are automatically advanced by gravity into the melter 32 in proportion to the rate of melting carried on within the melter 32. The cooled liner or baffle 98 prevents the marbles or pieces of glass from contacting the upper regions of the walls of the melter and hence substantially reduces or eliminates any tendency for devitrification occurring at these wall regions of the melter.

Replenishment of molten glass in the feeder 30 is assured by the continuous flow or delivery of molten glass from the melter 32 through the restricted passage or throat 92, the glass level being maintained by control of the electric energy and hence the heat applied to the melter in the manner above described.

The arrangement of the invention obtains several advantages over prior melter and feeder arrangements. By forming the melter and the feeder as a unit construction without any open areas between the melter and feeder, the heat losses are reduced to a minimum, thus providing for a more efficient melting and feeding of the glass and facilitating more accurate control of the level of the glass in the feeder.

The arrangement provides for the substantial exclusion of air from the feeder and the region of the melter containing molten glass, thus further reducing the liability of heat loss and a reduction of volatiles emanating from the molten glass. It is found that the application of current flow through the feeder concomitantly with the application of current flow through the melter from a separate electric circuit does not impair the rate of melting of the marbles or cullet in the melter but substantially eliminates a region of marked temperature differential at the metallic connection of the walled throat 92 with the melter and the feeder so that little or no temperature variation attends the flow or transfer of molten glass from the melter into the feeder.

This method of operation avoids thermal shock to the molten glass in the feeder and thus eliminates the use of special heat accelerating devices in the feeder. Apparently the reduced cross-sectional wall area provided by the walls 90 defining the throat or restricted passage 92 functions in the nature of a resistance barrier between the current flow through the melter and the current flow through the feeder so that there is inappreciable cross current flow between the feeder and melter even though they are mechanically and electrically connected.

The arrangement preferably includes signal means for indicating abnormal or excessive variations in the level of the glass in the feeder 30. As shown schematically in FIGURE 6, a signal probe rod or bar 170 carried by the insulating member 147 extends into the feeder, the lower end being arranged above the normal level of the glass in the feeder so that it is normally out of contact therewith. The probe or signal bar 170 is connected with a coil 172 of a normally open relay 173, the contacts of the relay being in circuit with a power source L1, L2 and a signal means 175.

The signal means may be visual, as for example an electrically energizable lamp, or may be audible, such as a buzzer, bell or the like. The circuit connection 177 through the relay coil 172 is connected with the circuit through the terminal lug 114. When the level of glass in the feeder 30 is below the probe signal bar 170, no current flows through the relay coil 172. When the glass level rises to establish contact with the bar 170, current flows through the glass, the bar 170 and relay coil 172 energizing the armature of relay 173 to close the contacts to complete the circuit through the signal means 175 indicating an abnormal rise in the glass level in the feeder 30.

Also mounted in the insulating member 147 is a second probe signal bar 179 connected with a coil 180 of a relay 182 which is held in open circuit position by current flow through the relay coil 180.

When the level of glass in the feeder 30 falls below the tip or extremity of the probe signal bar 179, current flow through the coil 180 is interrupted and the contact of relay 182 closed by a biasing spring to complete a circuit through a second signal means 184. The signal means 184 may be in the form of an electrically energizable lamp providing a visual signal, or a buzzer, bell or the like giving an audible signal, the contacts of the relay and the signal means 184 being in circuit with a power supply L1, L2.

In this manner, audible or visual signals are provided to indicate to an operator any abnormal increase or decrease in the level of glass in the feeder 30 so that proper corrections may be had of the control circuits for the feeder and melter.

It is apparent that, within the scope of the invention, modifications and different arrangements may be made other than as herein disclosed, and the present disclosure is illustrative merely, the invention comprehending all variations thereof.

I claim:

1. Apparatus for processing heat-softenable mineral material including, in combination, a walled melting chamber positioned to receive pieces of the mineral material from a supply, a walled feeder chamber, a restricted walled passage connecting the melting and feeder chambers, the walls forming the restricted passage being joined with the walls of the melting and feeder chambers providing a substantially unvented feeder chamber, a bottom wall of the feeder chamber being formed with a plurality of orifices through which molten material flows from the feeder chamber in a plurality of streams, a first circuit for supplying electric current to the melting chamber to provide heat for melting the pieces of material, a second circuit for supplying electric current to the feeder chamber, and means responsive to variations in the level of the molten material in the feeder chamber for varying the current flow to the melting chamber to control the rate of melting the material in the melting chamber, and means disposed at the entrance zone of the melting chamber in heat transferring relation with the chamber for controlling the temperature at the region of delivery of the pieces of material into the melting chamber.

2. Apparatus for processing heat-softenable mineral material including, in combination, a walled melting chamber positioned to receive pieces of the mineral material from a supply, a walled feeder chamber, a restricted walled passage connecting the melting and feeder chambers, the walls forming the restricted passage being joined with the melting and feeder chambers providing a substantially unvented feeder chamber, a bottom wall of the feeder chamber being formed with a plurality of orifices through which molten material flows from the feeder chamber in a plurality of streams, a first circuit for supplying electric current to the melting chamber to provide heat for melting the pieces of material, a second circuit for supplying electric current to the feeder chamber, and means incorporated in the first circuit responsive to variations in the level of the molten material in the feeder chamber for varying the current flow to the melting chamber to control the rate of melting the material in the melting chamber, a metal member disposed at the periphery of the entrance zone of the melting chamber, and tubular means in heat transferring relation to the member and adapted to accommodate a circulating fluid medium for controlling the temperature at the region of delivery of the pieces of material into the melting chamber.

3. The method of processing heat-softenable mineral material including establishing a supply of bodies of the mineral material, delivering the bodies to a melting zone by melting advancing bodies in said zone, applying electric current to the material in the melting zone to soften the material to a flowable condition, flowing the material through a walled restricted passage from the melting zone to an unvented feeder zone, screening the molten material in the feeder zone, applying electric current to the material in the feeder zone to maintain the material at a particular viscosity, flowing streams of the material from the feeder zone, varying the electric current applied to the melting zone to regulate the rate of melting of the bodies of material in the melting zone, and circulating a temperature controlling medium adjacent the delivery of the bodies into the melting zone to avoid premature melting of the bodies.

4. The method of processing heat-softenable mineral material including establishing a supply of bodies of the mineral material, delivering the bodies to a melting zone by melting advancing bodies in said zone, applying electric current to the material in the melting zone to soften the material to a flowable condition, flowing the material through a restricted confined region from the melting zone to a substantially unvented feeder zone, screening the molten material in the feeder zone, applying electric current to the material in the feeder zone to maintain the material at a particular viscosity, flowing streams of the material from the feeder zone, varying the electric current applied to the melting zone to regulate the rate of melting of the bodies of material in the melting zone, and continuously circulating a heat absorbing medium adjacent the delivery of the bodies into the melting zone to avoid premature melting of the bodies.

5. The method of processing heat-softenable mineral material including establishing a supply of bodies of the material, supporting the supply of bodies by a melting chamber, feeding the bodies from the supply by gravity to the melting chamber by melting advancing bodies in the chamber, applying heat to the bodies in the melting chamber to reduce the bodies to a molten condition, flowing the molten material from the melting chamber through a restricted passage into an unvented feeder zone, screening the molten material in the feeder zone, applying heat to the material in the feeder zone to maintain the material in a flowable condition, and flowing streams of the molten material from the feeder zone.

6. Apparatus for melting and conditioning heat-softenable mineral material including, in combination, a combined melting and material conditioning unit comprising a melting chamber and a material conditioning chamber, said melting chamber being arranged to receive pieces of the mineral material from a supply, a walled passage of restricted cross-sectional area connecting the melting and material conditioning chambers, the walls forming the restricted passage being joined with the walls of the melting and material conditioning chambers providing a substantially unvented material conditioning chamber, a bottom wall of the material conditioning chamber being formed with a plurality of orifices through which the molten material flows from the material conditioning chamber in a plurality of streams, terminal members provided on said melting chamber, terminal members provided on said material conditioning chamber, a first circuit connected with the terminal members on the melting chamber for supplying electric current providing heat for melting the pieces of material, a second circuit connected with the terminal members on said material conditioning chamber for supplying electric current thereto, and means incorporated in said first circuit responsive to variations in the level of the molten material in the material conditioning chamber for varying the current flow to the melting chamber to control the rate of melting of the material in the melting chamber.

7. Apparatus for melting and conditioning heat-softenable mineral material including, in combination, a combined melting and material conditioning unit comprising a melting chamber and a material conditioning chamber, said melting chamber being arranged to receive pieces of the mineral material from a supply, a walled passage of restricted cross-sectional area connecting the melting and material conditioning chambers, the walls forming the restricted passage being joined with the walls of the melting and material conditioning chambers providing a substantially unvented material conditioning chamber, a wall of the material conditioning chamber being formed with a plurality of orifices through which the molten material flows from the material conditioning chamber in a plurality of streams, a first circuit connected with the melting chamber for supplying electric current providing heat for melting the pieces of material, a second circuit connected with the material conditioning chamber for supplying electric current thereto, means for varying the current flow to the melting chamber to control the rate of melting of the material in the melting chamber, and signal means responsive to variations in the level of molten material in the material conditioning chamber for indicating an increase or decrease in the level of the material in the material conditioning chamber.

8. Apparatus for melting and conditioning heat-softenable mineral material including, in combination, a combined melting and material feeding unit comprising a melting chamber and a feeder chamber, said melting chamber being arranged to receive pieces of the mineral material from a supply, a walled passage of restricted cross-sectional area connecting the melting and feeder chambers, the walls forming the restricted passage being joined with the walls of the melting and feeder chambers providing an unvented material conditioning chamber, a bottom wall of the material conditioning chamber being formed with a plurality of orifices through which the molten material flows from the feeder chamber in a plurality of streams, terminal members provided on said melting chamber, terminal members provided on said feeder chamber, a first circuit connected with the terminal members on the melting chamber for supplying electric current providing heat for melting the pieces of material, a second circuit connected with the terminal members on said feeder chamber for supplying electric current thereto, means responsive to variations in the level of the molten material in the feeder chamber for varying the current flow to the melting chamber to control the rate of melting of the material in the melting chamber, and signal means responsive to excessive variations in the level of molten material in the feeder chamber for indicating excessive increase or decrease in the level of the material in the feeder chamber.

9. The method of processing heat-softenable mineral material including establishing a supply of bodies of the mineral material, delivering the bodies to a melting zone by melting advancing bodies in said zone, applying electric current to the material in the melting zone to soften the material of the bodies to a flowable condition, flowing the material through a restricted passage from the melting zone to an unvented feeder zone, screening the molten material in the feeder zone, applying electric current to the material in the feeder zone to maintain the material at a particular viscosity, flowing streams of the material from the feeder zone, and varying the electric current applied to the melting zone dependent upon variations in the level of the material in the feeder zone to regulate the rate of melting of the bodies of material in the melting zone.

10. Apparatus for processing heat-softenable mineral material including, in combination, a walled melting chamber positioned to receive pieces of the mineral material from a supply, said melting chamber forming a support for a bulk supply of the pieces of mineral material, a walled feeder chamber, a restricted walled passage connecting the melting and feeder chambers, the walls forming the restricted passage being joined with the walls of the melting and feeder chambers providing a substantially unvented feeder chamber, a bottom wall of the feeder chamber being formed with a plurality of orifices through which molten material flows from the feeder chamber in a plurality of streams, a first circuit for supplying electric current to the melting chamber to provide heat for melting the pieces of material, a second circuit for supplying electric current to the feeder chamber, and means responsive to variations in the level of the molten material in the feeder chamber for varying the flow of electric current to the melting chamber to control the rate of melting the material in the melting chamber.

References Cited in the file of this patent

UNITED STATES PATENTS

| | | |
|---|---|---|
| 1,954,732 | Gossler | Apr. 10, 1936 |
| 2,212,528 | Slayer | Oct. 27, 1940 |
| 2,465,283 | Schlehr | Mar. 22, 1949 |
| 2,483,333 | Cannon et al. | Sept. 27, 1949 |
| 2,485,851 | Stevens | Oct. 25, 1949 |
| 2,565,136 | Kretzmev | Aug. 21, 1951 |
| 2,613,443 | Helmick | Oct. 14, 1952 |
| 2,645,749 | Labino et al. | July 14, 1953 |
| 2,692,296 | De Piolenc et al. | Oct. 19, 1954 |
| 2,737,807 | Brichard | Mar. 13, 1956 |
| 2,794,058 | Russell | May 28, 1957 |
| 2,877,495 | Wegener et al. | Mar. 17, 1959 |